United States Patent Office 3,023,234
Patented Feb. 27, 1962

3,023,234
PROCESS FOR THE PRODUCTION OF AROMATIC DI- AND POLYCARBOXYLIC ACIDS
Hartwig Schutt, Dusseldorf-Benrath, and Werner Stein, Dusseldorf-Holthausen, Germany, assignors to Henkel & Cie. G.m.b.H., Dusseldorf-Holthausen, Germany, a corporation of Germany
No Drawing. Filed Sept. 30, 1957, Ser. No. 686,858
Claims priority, application Germany Oct. 2, 1956
17 Claims. (Cl. 260—515)

This invention relates to the production of aromatic carboxylic acids. The invention more particularly relates to a process for producing desired aromatic carboxylic acids in high yields by causing the rearrangement of the carboxyl groups of salts of aromatic carboxylic acids other than the one to be produced by heating the acid salts in a substantially oxygen-free anhydrous inert atmosphere at relatively low pressures in the presence of salts or derivatives of cyanic acid or its polymers. For example, terephthalic acid may be produced from potassium benzoate in such a manner.

It is an object of this invention to produce di- or higher aromatic polycarboxylic acids in high yields by the rearrangement of the carboxyl groups of aromatic carboxylic acids other than the one to be prepared.

Another object is to produce aromatic polycarboxylic acids in greater than theoretical yield based on the carboxyl groups of the starting acids.

Another object of this invention is to provide a process that may be operated at relatively low pressures to produce a yield of aromatic polycarboxylic acids greater than the theoretical yield based on the number of carboxyl groups in the starting acids.

Another object is to provide a catalyst which will produce high yields of aromatic polycarboxylic acids while operating the process at relatively low pressures.

Another object is to provide an aromatic carboxylic acid rearrangement process which may be conducted at atmospheric pressure and without regard to the type of atmosphere.

These and other objects of this invention will become apparent as the description thereof proceeds.

We have previously discovered that the alkali metal salts of carboxylic acids with carboxyl groups which are attached to aromatic ring systems or to heterocyclic rings having an aromatic structure can be transformed into salts of other carboxylic acids with at least two carboxyl groups in the molecule by heating to elevated temperatures in the presence of an inert protective gas. In this reaction the carboxyl groups may change position within the same molecule as well as between different molecules. The reaction products obtained thereby are industrially valuable di- and polycarboxylic acids, for example terephthalic acid. In addition, especially in those cases when alkali metal salts of monocarboxylic acids are used as starting materials, the ring systems free from carboxyl groups are obtained as by-products.

The subject matter of the present invention is an improvement of this process which is effected by an addition of alkali metal salts, preferably potassium salts, of derivatives of cyanic acid or its polymers to the reaction mixture. Suitable polymers or derivatives of cyanic acid are, for example, cyanuric acid, cyanamide and dicyandiamide. The derivatives of cyanic acid are preferably employed in the form of their potassium salts provided they form salts with alkali metals.

In many cases the use of potassium cyanate offers special advantages. This salt melts at above 320° C. It has now, surprisingly, been found that a melt of potassium cyanate is an excellent solvent for many of the salts which are used as starting materials or as catalysts in the process according to the invention. This is also often true for those salts which are difficultly soluble in water. Thus dipotassium phthalate is very soluble in such a melt. Moreover, 10.0 g. of molten potassium cyanate will dissolve, for example, 3.0 g. cadmium carbonate, more than 2.5 g. cadmium fluoride, about 5.1 g. lead fluoride or 2.0 g. zinc fluoride. Advantageous effects are also found in those cases where the starting materials are difficultly soluble in molten potassium cyanate or in those cases where the added amount of potassium cyanate is not large enough to form a solution with the remaining reaction partners.

Accordingly, the present application relates to a process for the production of aromatic or heterocyclic di- or polycarboxylic acids or their salts or derivatives by transformation of salts of other aromatic or heterocyclic carboxylic acids at elevated temperatures and with exclusion of substantial amounts of oxygen or water, wherein the transformation takes place in the presence of the above-mentioned salts or derivatives of cyanic acid or its polymers. The salts obtained thereby may be transformed into the corresponding free acids or their derivatives in accordance with known methods.

The starting materials for the process of our invention may be salts of aromatic mono-, di- or polycarboxylic acids. Such acids include, for example, benzoic acid, α- and β-naphthoic acid, diphenylmonocarboxylic acid, phthalic acid, isophthalic acid, naphthalic acid and other naphthalene dicarboxylic acids, diphenic acid and other diphenyl dicarboxylic acids. Similarly, mono- or dicarboxylic acid in which the carboxyl groups are attached to another type of aromatic ring system, for example, to anthracene, terphenyl, diphenyl methane or benzophenone, are suitable as starting materials, as well as tri- and polycarboxylic acids which are derived from aromatic ring systems. Furthermore, mixtures of such acids as are obtained by oxidation of raw xylene mixtures or of coal may be used as starting materials. Other starting materials for the process in accordance with the invention include salts of mono- or polybasic heterocyclic carboxylic acids, the carboxyl groups of which are attached to heterocyclic rings having an aromatic structure. Such acids are derived, for example, from pyridine, pyrazine, pyrimidine, pyridazine, pyran, furan, thiophene, thiazole, pyrazole, imidazole, quinoline, isoquinoline or indole. In all of these carboxylic acids the aromatic or the heterocyclic ring having an aromatic structure may comprise other substituents such as halogen atoms or alkyl radicals in addition to the carboxyl groups, provided such substituents do not cause a decomposition of the molecule below the reaction temperature.

The above-mentioned carboxylic acids are used for the process of this invention in the form of their salts. Advantageously the alkali metal salts are used, preferably the potassium or sodium salts. The rubidium and cesium salts are equally suitable as such, but must usually be excluded for economic reasons. In place of the salts, mixtures may also be used which are transformed into the salts upon heating, for example, mixtures of anhydrides of the carboxylic acids and alkali metal carbonates. In such mixtures, the components need not be present in stoichiometric ratio. It is often advantageous to use mixtures of salts of two different metals, for example, mixtures of sodium and potassium salts because in many cases the mechanical properties of the reaction mixture are improved thereby.

The process may also be carried out with salts of other meals, for example, with the alkaline earth metal salts of the above-mentioned carboxylic acids. Under those circumstances, other reaction products are often formed, especially other isomers than when the alkali metal salts are employed.

If salts of aromatic or heterocyclic monocarboxylic acids are used as starting materials it is necessary to add to the reaction mixture acid-binding agents, especially carbonates, bicarbonates, formates or oxalates of the alkali metals, particularly of potassium, in addition to the alkali metal salts or derivatives of cyanic acid or its polymers, in order to achieve good yields. Similarly, the corresponding compounds of other metals, for example, of the alkaline earth metals are suitable for this purpose. The above-mentioned acid-binding agents need not be used in stoichiometric quantities. They may be used in excess or less than stoichiometric quantities. It is an advantage of the procedure according to the present invention that good yields are obtained even when less than stoichiometric amounts of the acid-binding agents are used. If salts of aromatic or heterocyclic di- or polycarboxylic acids are used as starting materials the addition of the above-mentioned salts, for example, of potassium carbonate, in many cases also brings with it certain advantages, for example, an improvement of the mechanical properties of the reaction mixture and an increase in the yield of tri- and polycarboxylic acids.

The salts or salt mixtures to be reacted are preferably used in a dry and as finely divided state as possible. If the salts are available in the form of aqueous solutions they can be transformed into dry powders in accordance with the known processes, preferably by spray drying, and may thereafter be subjected to additional drying in order to remove minute residual quantities of moisture.

We have further found that the reaction according to the present invention is favorably influenced by the presence of catalysts. The catalysts may be heavy metals such as cadmium, zinc, mercury, lead and iron as well as compounds of these metals such as their oxides, their salts formed with inorganic or organic acids, their complex salts or their organometallic compounds, for example, their carbonates, bicarbonates, halides, sulfates, phosphates, acetates, formates, oxalates, fatty acid salts or also the salts of the above-mentioned metals formed with those acids which may be used as starting materials for the reaction according to the invention or which are formed by this reaction, for example, their benzoates, phthalates or terephthalates. The amount of catalyst may vary within wide limits, for example, up to 15% by weight based on the weight of the reaction mixture but preferably from 0.5 to 5% by weight. The catalysts may be finely divided throughout the reaction mixture by transforming an aqueous solution of the salts serving as the starting materials which has the catalysts dissolved or suspended therein into a dry powder by spray drying or any suitable manner. The above-mentioned catalysts may also be used in conjunction with known carriers such as kieselguhr.

An advantageous embodiment of the process in accordance with this invention consists in dissolving compounds of the above-mentioned metals which serve as catalysts, especially salts of cadmium, in a melt of potassium cyanate and thereafter adding this melt to the reaction mixture, possibly after cooling and comminuting the cooled melt. In the production of such solutions it is advantageous not to exceed the decomposition temperature of the particular salts. For example, on dissolving cadmium salts at temperatures above 400° C. the clear melt sometimes turns cloudy accompanied by a separation of brown cadmium oxide. The effectiveness of the catalysts is increased by their dissolution in the potassium cyanate melt so that in many cases the yield is improved and the required amount of catalyst is reduced in comparison to the methods heretofore employed.

In accordance with the process of the present invention the above-mentioned starting materials are heated to temperatures to which a rearrangement of the aromatic or heterocyclic carboxylic salts into salts of other carboxylic acid occurs. This rearrangement, as a rule, sets in at temperatures above 300° C. and in the case of a few heterocyclic carboxylic acids at temperatures between 250 and 300° C. The starting materials are advantageously heated in the presence of inert gases, preferably in the presence of carbon dioxide. In place of carbon dioxide, gaseous mixtures may be used which contain other inert gases such as nitrogen, methane or argon in addition to carbon dioxide. It is advantageous to exclude the presence of substantial quantities of oxygen. In many cases it is advantageous to carry out the rearrangement reaction at elevated pressures, preferably in an atmosphere of carbon dioxide at elevated pressures; in general good yields are obtained within a range of pressures below 100 atmospheres. However, the use of more elevated pressures is not detrimental.

The optimum reaction temperature varies and depends upon the starting materials used. For example, in the production of potassium terephthalate from potassium benzoate the optimum reaction temperature is about 370 to 400° C. The upper temperature limit for the present process is generally determined only by the decomposition temperature of the organic substance which in many cases lies above 500° C.

In those cases where the reaction mixture tends to cake it is often advantageous to carry out the process in the presence of inert liquid or solid additives which are adapted to prevent caking and to improve the gas permeability of the reaction mixture. Such additives include, for example, sand, powdered pumice, powdered metals, metal shavings, kieselguhr, activated charcoal, finely divided aluminum oxide, finely divided silicic acid or also inert salts such as sodium sulfate. In place of these solid inert substances, inert liquids may also be used which do not decompose under the prevailing conditions such as diphenyl or diphenyl ether.

In carrying out the reaction of the present invention it may be advantageous to agitate the reaction mixture in order to prevent local over-heating and decomposition caused thereby as well as to prevent caking of the reaction mixture. This agitation may be accomplished by subjecting the reaction mixture to the heat treatment in vessels provided with a stirrer, in reaction vessels provided with a helix, in tumblers or in shakers or rotating autoclaves. Uniform heating may, however, also be effected by distributing the reaction mixture in thin layers within the reaction vessel with or without agitation. Good yields are, however, also obtained without applying any of the above special measures, provided care is taken that strong local over-heating is prevented.

A special and industrially important embodiment of the process in accordance with the present invention consists of using alkali metal salts, especially potassium salts, of aromatic or heterocyclic monocarboxylic acids as starting materials and heating the same in the presence of acid-binding agents, preferably potassium carbonate, in an atmosphere of carbon dioxide under pressure. In this embodiment compounds of the above-mentioned metals may be added as catalysts which are advantageously dissolved in a potassium cyanate melt. The applicants have previously found that the transformation of salts of aromatic or heterocyclic monocarboxylic acids into salts of di- and polycarboxylic acids by heating to elevated temperatures in an atmosphere of carbon dioxide under pressure may be carried out especially advantageously by operating at pressures above 400 atmospheres, preferably in the presence of acid-binding agents. This method produced considerably improved yields of polycarboxylic acid, preferably dicarboxylic acids, while the amounts of aromatic or heterocyclic compounds free from carboxyl groups which are formed as side products decreased or completely disappeared. On the basis of the yields obtained thereby it had to be assumed that carbon dioxide entered into the aromatic or heterocyclic ring either from the gas phase or also from the carbonate present as the acid-binding agent accompanied by the formation of new carboxyl groups.

The addition of salts or derivatives of cyanic acid or its polymerization products in accordance with this invention makes it possible to introduce additional carboxyl groups into the aromatic or heterocyclic monocarboxylic acids even at pressures lower than 400 atmospheres, for example, the pressures from 5 to 100 atmospheres. For instance, terephthalic acid may be obtained in this manner from benzoic acid with excellent yields, especially from potassium benzoate in the presence of potassium carbonate.

Other industrially valuable dicarboxylic acids or their salts may also be obtained in this manner with very good yields from monocarboxylic acids, more particularly those dicarboxylic acids having symmetric structure such as naphthalene-2,6-dicarboxylic acid, pyridine-2,5-dicarboxylic acid, thiophene-2,5-dicarboxylic acid and the like. In many cases tricarboxylic acids are formed as side products. Under these conditions the orginial carboxyl group sometimes migrates within the molecule or between molecules so that when heterocyclic monocarboxylic acids, for example, are used as starting materials the end products obtained from the reaction no longer corresponds to the starting materials with respect to the structure. A further industrially valuable embodiment of the process according to the invention consists in using as starting materials potassium salts of those aromatic di- and polycarboxylic acids which are capable of forming internal anhydrides and heating the starting materials in the presence of potassium cyanate and a suitable catalyst, preferably a cadmium compound. In many cases, depending upon the reaction conditions, this method produces varying quantities of other reaction products than those produced by the methods heretofore used. For example, depending upon the temperature used and the reaction time, potassium orthophthalate produces mixtures which contain varying quantities of potassium isophthalate in addition to terephthalate and unreacted orthophthalate. At low reaction temperatures, between 320 and 400° C., the isophthalate may become the principal reaction product.

The upper temperature limit for the production of isophthalate is about 450° C. At this temperature only a short period of heating forms isophthalate in addition to a large quantity of terephthalate. For the production of terephthalate by this method, temperatures up to about 500° C. may be used. It should be noted, however, that many of the salts used as catalysts decompose at temperatures above 400° C. accompanied by a separation of insoluble products.

Heretofore it has been possible to produce terephthalic acid by a thermo-rearrangement of salts of orthophthalic acid or other aromatic dicarboxylic acids with a corresponding structure but not isophthalic acid. Isophthalic acid was not even produced as a side product in the heretofore known processes. It has further been found that at the rearrangement of dicarboxylic acid salts according to the present invention, substantial quantities of salts of tri- or polycarboxylic acids are formed as side products in many cases and that simultaneous rearrangement reactions occur. The yields of polycarboxylic acids, especially of tricarboxylic acids, are often greater by using the procedure described herein than using previously known methods. Moreover, other isomers are formed to some extent in the novel rearrangement process.

Since potassium orthophthalate, as well as other potassium salts of aromatic di- or polycarboxylic acids which are capable of forming internal anhydrides, is very highly soluble in molten potassium cyanate in contrast to potassium isophthalate or terephthalate, and moreover, since more of the compounds of the metals cadium, zinc, iron, lead and mercury, used as catalysts are also soluble in such a melt, an advantageous embodiment of the process according to this invention consists of carrying out the reaction using the above-mentioned starting materials in a potassium cyanate melt. For this purpose, a melt of potassium cyanate may either be produced first and the remaining starting materials may be dissolved therein with accompanying stirring, or the starting materials may simply be heated together with the cyanate. In order to obtain a homogeneous melt it is, as a rule, necessary that the amount of potassium cyanate present be greater than the amount of potassium salt of the aromatic carboxylic acid.

In this embodiment of the process in accordance with the invention it is not necessary to work in an inert atmosphere at elevated pressure. The detrimental effect of the presence of oxygen from the air upon the starting materials is sufficiently counteracted by the cyanate melt.

The separation of the reaction mixture is facilitated by this special embodiment of the process in that many of the reaction products, for example, the dipotassium isophthalate or the dipotassium terephthalate, are difficultly soluble in molten potassium cyanate and therefore crystallize out. It is, therefore, possible to separate the reaction product and recover the cyanate melt, if desired, in a continuous fashion.

In general, the separation of the reaction mixture may be accomplished in known manner, for example, as follows: the raw reaction product is first dissolved in water or in dilute acids and the solution is purified by filtration or by treatment with activated charcoal or other discoloring agents. Subsequently, the salts formed by the reaction may, for example, be transformed into the corresponding free acids by acidification of the purified solution with organic or inorganic acids or also by introduction of carbon dioxide at atmospheric or elevated pressures. The free acids may then be separated from each other and isolated in pure form by methods based upon their varying solubilities or volatilities, and the free acids may then be transformed, if desired, into their derivatives. The salt mixtures obtained by the rearrangement reaction may also be transformed directly into derivatives of the corresponding acids, for example, into their esters or halides, and these derivatives may be purified by fractional distillation.

If large amounts of potassium cyanate are present it is advantageous to work up the reaction mixture by concentrating the aqueous solution of the raw reaction mixture, which has previously been freed from catalysts by filtration, in a vacuum evaporator at temperatures at which the cyanate does not hydrolyze. The dipotassium terephthalate, for example, completely crystallizes out of the concentrated solution while the dipotassium isophthalate crystallizes out to a substantial degree. Unreacted dipotassium orthophthalate remains in the mother liquor which is evaporated to dryness. The resulting mixture consisting of dipotassium orthophthalate and potassium cyanate may be employed anew in the above described melt process.

The separation of the reaction mixture may also be accomplished by acidifying the purified aqueous solution of the raw reaction product with a mineral acid, but the potassium cyanate is lost thereby. By boiling the acid solution the liberated cyanic acid is destroyed. The further separation of the reaction product may be accomplished by customary methods, for example, by the procedure based upon the varying solubilities of the liberated carboxylic acid in water or other solvents.

The following examples will enable persons skilled in the art to better understand and practice the invention and are not intended to limit the invention.

*Example 1*

A mixture of 10.0 gm. potassium benzoate, 30.0 gm. commercial technical grade potassium cyanate, 30.0 gm. anhydrous potassium carbonate and 3.0 gm. cadmium fluoride was milled in a ball mill and thereafter heated for 5 hours at 380° C. in a rotary autoclave having a net volume of 200 cc. Prior to heating, carbon dioxide was introduced until the internal temperature reached 50 atmospheres. During the heating step the pressure first rose to 124 atmospheres and thereafter, over a period of about two hours, fell again to 100 atmospheres and then did not change any more until the end of the heat treatment. After cooling the autoclave and releasing the internal pressure, the raw, light gray reaction product which weighted 73.1 gm. was dissolved in 500 cc. water and the resulting solution was filtered. The filtrate was heated and acidified while hot with hydrochloric acid whereby terephthalic acid precipitated out. The terephthalic acid was filtered off while the solution was still hot and the filter cake was washed with hot water. 7.5 gm. terephthalic acid were obtained.

*Example 2*

The same starting material as in Example 1, but without the addition of cadmium fluoride, were reacted under the same conditions. The yield of terephthalic acid was 6.6 gm.

*Example 3*

The same starting materials as in Example 1 were placed into a rotary autoclave having a net volume of 200 cc. and thereafter heated for 4 hours at 380° C. in an atmosphere of carbon dioxide at an initial pressure of 30 atmospheres. During the heat treatment the pressure rose to 52 atmospheres and then fell to about 40 atmospheres. The light-gray reaction product was worked up in the above described manner and yielded 7.5 gm. terephathalic acid.

*Example 4*

The same starting materials as in Example 1 were placed into a rotary autoclave having a net volume of 200 cc. and heated for 8 hours at 375° C. in an atmosphere of carbon dioxide at an initial pressure of 50 atmospheres. The pressure first rose to 115 atmospheres and then fell to about 98 atmospheres. The light-gray reaction product which weighed 76.5 gm. was worked up in the same manner as described in Example 1 and yielded 7.8 gm. terephthalic acid.

*Example 5*

A mixture of 10.0 gm. potassium benzoate, 15.0 gm. potassium cyanate, 30.0 gm. potassium carbonate and 3.0 gm. cadmium fluoride was heated for 4 hours at 380° C. in a rotary autoclave having a net volume of 200 cc. in an atmosphere of carbon dioxide at an initial pressure of 50 atmospheres. No decrease in pressure was observed during the reaction. The white raw reaction product was worked up in the above decribed manner and yielded 7.0 gm. terephthalic acid.

*Example 6*

A mixture of 10.0 gm. potassium benzoate, 10.0 gm. potassium cyanate, 30.0 gm. potassium carbonate and 3.0 gm. zinc oxide was heated in a rotary autoclave having a net volume of 200 cc. for 4 hours at 380° C. in an atmosphere of carbon dioxide at an initial pressure of 50 atmospheres. The reaction mixture was worked up in the above described manner and yielded 7.2 gm. terephthalic acid.

*Example 7*

A mixture composed of the same starting materials as in Example 1 was heated for 5 hours at 380° C. in a rotary autoclave having a net volume of 200 cc. in an atmosphere of carbon dioxide at an initial pressure of 10 atmospheres. A maximum pressure of 23 atmospheres developed. The reaction product was worked up in the manner described in the preceding examples and yielded 5.4 gm. terephthalic acid.

*Example 8*

50 gm. of a mixture consisting of equimolar amounts of potassium carbonate and dipotassium cyanamide were finely milled in a ball mill with 10.0 gm. potassium benzoate and 3.0 gm. cadmium fluoride. Subsequently, the resulting mixture was placed into a rotary autoclave having a volume of 200 cc. and heated for 5 hours at 380° C. in an atmosphere of carbon dioxide at a pressure of about 100 atmospheres. The reaction mixture was worked up in the manner described in Example 1. 7.3 gm. terephthalic acid were obtained.

*Example 9*

A mixture of 10 gm. potassium benzoate, 20 gm. potassium carbonate, 20 gm. potassium cyanate, 20 gm. activated bentonite and 3 gm. cadmium fluoride was heated for 5 hours at 380° C. in a rotary autoclave having a volume of 200 cc. in an atmosphere of carbon dioxide at an initial pressure of 50 atmospheres. The raw reaction product was dissolved in 1 liter water and the solution was filtered. The filter cake was carefully washed with water and the wash water was combined with the filtrate. The filtrate was heated and acidified with hydrochloric acid while hot whereby 8.3 gm. terephthalic acid were obtained.

*Example 10*

A mixture of 10 gm. potassium benzoate, 5 gm. potassium cyanate, 30.0 gm. potassium carbonate and 3.0 gm. cadmium fluoride was heated for 4 hours at 380° C. in a rotary autoclave having a volume of 200 cc. in an atmosphere of carbon dioxide at an initial pressure of 50 atmospheres. The reaction product was worked up in the previously described manner, 5.8 gm. terephthalic acid were obtained.

*Example 11*

The same starting materials as in Example 1 were heated in a rotary autoclave having a volume of 200 cc. for 5 hours at 380° C. in an atmosphere of carbon dioxide at an initial pressure of 20 atmospheres. A maximum pressure of 41 atmospheres developed. The reaction mixture was worked up in the customary manner. 6.7 gm. terephthalic acid were obtained.

*Example 12*

An aqueous solution of cyanuric acid, produced from urea, was neutralized with an excess of potassium carbonate such that after gently evaporating the solution a mixture was obtained which consisted of 1 part by weight of the tripotassium salt of cyanuric acid and 3 parts by weight of potassium carbonate. This mixture was carefully dried. Subsequently, 10.0 gm. potassium benzoate, 40.0 gm. of the above mixture and 3.0 gm. cadmium fluoride were intimately admixed by milling and the resulting mixture was heated for 8 hours at 390° C. in an autoclave having a volume of 200 cc. in an atmosphere of carbon dioxide at a pressure of about 130 atmospheres (at 390° C.). The reaction product was worked up in the manner described in Example 1. 5.7 gm. terephthalic acid were obtained.

*Example 13*

20.0 gm. of the mixture of potassium cyanurate and potassium carbonate described in Example 12 were milled with 10.0 gm. potassium benzoate and 3.0 gm. cadmium fluoride and the resulting mixture was heated for 5 hours at 390° C. in a rotary autoclave having a volume of 200 cc. in an atmosphere of carbon dioxide at a pressure of 130 atmospheres (at 390° C.). The reaction product was worked up in the manner above described. 6.7 gm. terephthalic acid were obtained.

*Example 14*

100.0 gm. technical grade potassium cyanate were placed into a test tube-like glass insert fitted in a heated aluminum block. The potassium cyanate was then liquified into a clear melt at a temperature of 340° C. At the same temperature 30.0 gm. cadmium carbonate were added to the melted potassium cyanate while stirring the same. After about 10 minutes the cadmium carbonate had gone completely into solution. During the entire period a stream of dried nitrogen was passed over the molten salt. Thereafter, the melt was cooled and pulverized. A mixture of 10.0 gm. potassium benzoate, 5.0 gm. anhydrous potassium carbonate and 5.0 gm. of the pulverized potassium cyanate-cadmium carbonate melt was thoroughly milled and placed into a rotary autoclave having a volume of 200 cc. Thereafter, the air was displaced from the autoclave with the aid of carbon dioxide and after closing the autoclave carbon dioxide was continued to be introduced until the internal pressure reached 50 atmospheres (at 40° C.). Subsequently, the reaction mixture in the autoclave was heated for 3 hours at 390° C. whereby an internal pressure of 120 atmospheres developed. After cooling the autoclave and releasing the internal pressure the reaction product which weighed 18.7 gm. was pulverized and dissolved in 400 cc. water. The resulting solution was then separated from insoluble components by filtration. The filtered solution was acidified with hydrochloric acid at a temperature of 100° C. The terephthalic acid which precipitated out was separated by vacuum filtration, washed with hot water and dried at 120° C. The yield of terephthalic acid was 6.9 gm.

*Example 15*

A mixture of 10.0 gm. potassium benzoate, 30.0 gm. anhydrous potassium carbonate and 5.0 gm. of a fused mixture of 10.0 gm. potassium cyanate and 3.0 gm. cadmium carbonate was heated in the manner described in the preceding examples in a rotary autoclave having a volume of 200 cc. for 8 hours at 390° C. in an atmosphere of carbon dioxide at an initial pressure (at 40° C.) of 50 atmospheres. The reaction product was worked up in the manner described in Example 1. 7.1 gm. terephthalic acid were obtained.

*Example 16*

A mixture of 10.0 gm. potassium benzoate, 30.0 gm. anhydrous potassium carbonate and 5.0 gm. of a fused mixture of 10.0 gm. potassium cyanate and 2.0 gm. cadmium fluoride was heated in the above described manner for 5 hours at 390° C. in an atmosphere of carbon dioxide at an initial pressure (at 40° C.) of 120 atmospheres in a rotary autoclave having a volume of 200 cc. A maximum pressure of 295 atmospheres developed. The reaction product was worked up in the manner described in Example 1. 6.7 gm. terephthalic acid were obtained.

*Example 17*

A mixture of 10.0 gm. potassium benzoate, 30.0 gm. anhydrous dipotassium oxalate and 10.0 gm. of the potassium cyanate-cadmium carbonate melt described in Example 14 was finely milled in a ball mill and placed into a rotary autoclave having a volume of 200 cc. Thereafter the contents of the autoclave were heated for 1 hour at 400° C. in an atmosphere of carbon dioxide at an initial pressure of 50 atmospheres (at 40° C.), whereby a maximum pressure of 160 atmospheres developed. The reaction product was worked up in the manner described in the preceding examples. 7.1 gm. terephthalic acid were obtained.

*Example 18*

In this example the quantity of potassium carbonate added to the reaction mixture as the acid-binding agent was varied. Mixtures, each consisting of 10.0 gm. potassium benzoate, 5.0 gm. of the catalyst melt described in Example 14 and the varying quantities of potassium carbonate were heated for 8 hours at 390° C. in a rotary autoclave having a volume of 200 cc. in an atmosphere of carbon dioxide in an initial pressure of 50 atmospheres. The following results were obtained:

1 gm. $K_2CO_3$ produced a yield of 5.4 gm. terephthalic acid
2 gm. $K_2CO_3$ produced a yield of 5.6 gm. terephthalic acid
3 gm. $K_2CO_3$ produced a yield of 5.9 gm. terephthalic acid
5 gm. $K_2CO_3$ produced a yield of 6.5 gm. terephthalic acid
10 gm. $K_2CO_3$ produced a yield of 6.4 gm. terephthalic acid
20 gm. $K_2CO_3$ produced a yield of 6.4 gm. terephthalic acid

*Example 19*

In this example the quantity of catalyst melt added to the reaction mixture was varied. Mixtures, each consisting of 10.0 gm. potassium benzoate, 5.0 gm. potassium carbonate and varying amounts of the catalyst melt described in Example 14 produced from 10.0 gm. potassium cyanate and 3.0 gm. cadmium carbonate, were heated for 8 hours at 390° C. in a rotary autoclave having a volume of 200 cc. in an atmosphere of carbon dioxide at an initial pressure of 50 atmospheres. The following results were obtained:

2.5 gm. catalyst melt yielded 6.3 gm. terephthalic acid
5.0 gm. catalyst melt yielded 6.5 gm. terephthalic acid
7.5 gm. catalyst melt yielded 6.0 gm. terephthalic acid

*Example 20*

In this example the reaction period was varied. Mixtures, each consisting of 10.0 gm. potassium benzoate, 5.0 gm. potassium carbonate and 5.0 gm. of the catalyst melt described in Example 14 produced from 10.0 gm. potassium cyanate and 3.0 gm. cadmium carbonate were heated at 390° C. in a rotary autoclave having a volume of 200 cc. in an atmosphere of carbon dioxide at an initial pressure of 50 atmospheres. The following yields were obtained:

Reaction period 1 hr.—yield 5.8 gm. terephthalic acid
Reaction period 2 hr.—yield 6.5 gm. terephthalic acid
Reaction period 5 hr.—yield 6.4 gm. terephthalic acid
Reaction period 8 hr.—yield 6.5 gm. terephthalic acid

*Example 21*

This example shows the influence of the reaction temperature. Mixtures, each consisting of 10.0 gm. potassium benzoate, 5.0 gm. potassium carbonate and 5.0 gm. of the catalyst melt described in Example 14 were heated for 2 hours in a rotary autoclave having a volume of 200 cc. in an atmosphere of carbon dioxide at an inital pressure of 50 atmospheres. The following yields were obtained:

Reaction temperature 370° C.—yield 5.6 gm. terephthalic acid
Reaction temperature 380° C.—yield 6.4 gm. terephthalic acid
Reaction temperature 400° C.—yield 5.9 gm. terephthalic acid
Reaction temperature 410° C.—yield 5.3 gm. terephthalic acid

*Example 22*

A mixture of 30.0 gm. potassium benzoate, 15.0 gm. potassium carbonate and 15.0 gm. of a catalyst melt, produced from 20.0 gm. potassium cyanate and 3.0 cadmium carbonate, was heated for 8 hours at 390° C. in a rotary autoclave having a volume of 200 cc. in an atmosphere of carbon dioxide at an initial pressure of 50 atmospheres. The reaction product was worked up in the manner described above and produced a yield of 16.7 gm. terephthalic acid.

*Example 23*

A mixture of 10.0 gm. potassium benzoate, 5.0 gm. anhydrous potassium carbonate and 10.0 gm. of a catalyst melt produced from 10.0 gm. potassium cyanate and 1.0 gm. zinc fluoride was heated for 8 hours at 390° C. in a rotary autoclave having a volume of 200 cc. in an atmosphere of carbon dioxide and an initial pressure of 50 atmospheres. The reaction product was worked up as described in the previous examples and yielded 6.7 gm. terephthalic acid.

*Example 24*

A mixture of 10.0 gm. potassium benzoate, 5.0 gm. anhydrous potassium carbonate and 10.0 gm. of a catalyst melt produced from 10.0 gm. potassium cyanate and 1.0 gm. anhydrous lead fluoride was heated for 8 hours at 390° C. in a rotary autoclave having a volume of 200 cc. in an atmosphere of carbon dioxide at an initial pressure of 50 atmospheres. The reaction product was worked up in the manner previously described and yielded 6.4 gm. terephthalic acid.

*Example 25*

1000 gm. technical grade potassium cyanate were placed into a 3-liter round bottom flask and were thereafter melted on a salt bath 360° C. accompanied by stirring. 30.0 gm. cadmium fluoride and 300.0 gm. dipotassium orthophthalate, which had previously been dried at 250° C. were added to the molten cyanate. A clear melt formed after about 10 minutes which was then heated for 2 additional hours at 340° C. After about 45 minutes, a gray crystalline mass separated out which caused the melt to solidify partly. After allowing the melt to cool the raw reaction product was dissolved in 12 liters water, the solution was filtered while cool, the filtrate was heated to a temperature just below its boiling point and then acidified with hydrochloric acid. The acidified solution was again heated to the boiling point and the terephthalic acid which separated out was separated by vacuum filtration while hot. The raw terephthalic acid was purified by dissolving it twice in sodium hydroxide and acidifying the alkaline solution at its boiling point in order to free it from co-precipitated isophthalic acid. 48.9 gm. terephthalic acid were obtained. The combined acid filtrates were cooled in order to crystallize out the isophthalic acid. After allowing the filtrate to stand the crystals formed were separated by vacuum filtration. Thereafter the mother liquor was evaporated to 5 liters and again cooled to permit crystallization of isophthalic acid. In this manner a total of 85.3 gm. isophthalic acid were obtained. By extraction of the mother liquor with ether in a perforator, 68.0 gm. unreacted orthophthalic acid were recovered. By examination of the ultra red spectrum it was determined that the orthophthalic acid thus recovered contained substantial amounts of trimesic acid, trimellitic acid and benzoic acid.

*Example 26*

100.0 gm. technical grade potassium cyanate were melted at 350° C. in a test tube-like glass insert embedded in an aluminum block which was heated by means of an electric heater. 5.0 gm. cadmium carbonate and then 30.0 gm. dipotassium orthophthalate were dissolved in this melt. Thereafter, the clear melt was heated for 2 hours at 350° C. After allowing the melt to cool the reaction product was dissolved in water and the solution was worked up as described in Example 25. 8.95 gm. terephthalic acid and 7.65 gm. isophthalic acid were obtained.

*Example 27*

100.0 gm. potassium cyanate, 30.0 gm. dipotassium orthophthalate and 5.0 gm. cadmium fluoride were milled in a ball mill and the resulting mixture was placed into an autoclave having a volume of 200 cc. Subsequently, carbon dioxide was introduced into the autoclave until the internal pressure reached 50 atmospheres. The autoclave was then heated for 1 hour at 320° C. whereby a maximum pressure of 124 atmospheres developed. The reaction product was worked up in the same manner as described in Example 25. 2.1 gm. terephthalic acid, 3.8 gm. isophthalic acid and 10.2 gm. unreacted orthophthalic acid were obtained.

*Example 28*

2.0 kg. technical grade potassium cyanate were melted at 350° C. in a stainless steel vessel provided with a salt bath heating jacket. 200 gm. $K_2CdF_2Cl_2$ catalyst were added to the clear melt. Thereafter, 1.2 kg. dipotassium orthophthalate were added in small portions over a period of a few minutes to the catalyst melt while agitating the same with an electric stirrer. In order to permit the reaction to go to completion the resulting mixture was stirred for an additional 15 minutes at 350° C. The foamy sludge formed thereby was allowed to cool, dissolved in about 25 liters cold water, the solution was filtered, heated to the boiling point and acidified with concentrated hydrochloric acid until the pH reached a value of 1. The solution was then concentrated in a vacuum to 18 liters and allowed to crystallize. After the crystallization was complete the crystals were separated by vacuum filtration. The acid mixture obtained thereby weighed 801 gm. It consisted of approximately equal parts of isophthalic acid and terephthalic acid.

*Example 29*

A mixture of 10.0 gm. potassium nicotinate, 20.0 gm. potassium carbonate, 20.0 gm. potassium cyanate and 2.0 gm. cadmium fluoride was finely milled in a ball mill and heated for 4 hours at 390° C. in a rotary autoclave having a volume of 200 cc. in an atmosphere of carbon dioxide at an initial pressure of 50 atmospheres (at 40° C.), whereby a maximum pressure of 183 atmospheres developed. The crude reaction product was dissolved in 300 cc. water and the warm resulting solution was filtered. The filtrate then was purified by addition of some activated charcoal. The anew filtrated solution was acidified with concentrated hydrochloric acid, whereby the raw isocinchomeronic acid precipitated out. 4.5 gm. of this acid were obtained.

While we have described particular embodiments of our invention, it will be understood that the invention is not limited thereto, and that various modifications and adaptions thereof may be made without departing from the spirit of the invention as set forth in the disclosure and the scope of the following claims.

We claim:

1. A process for producing as products alkali metal salts of unsubstituted cyclic carboxylic acids having from 2 to 3 carboxylic groups wherein the cyclic nucleus is selected from the group consisting of mono- and dicyclic aromatic and heterocyclic nuclei containing one hetero atom in the molecule, selected from the group consisting of oxygen, sulfur and nitrogen atoms, by heating as a starting material an alkali metal salt of a cyclic carboxylic acid having from 1 to 2 carboxyl groups in a different relationship on the cyclic nucleus than the carboxyl groups on the final product and corresponding in structure to the product as above produced which comprises the steps of heating said starting material in the presence of derivatives of cyanic acid selected from the group consisting of alkali metal salts of cyanic acid and its polymers cyanamide and dicyandiamide to a temperature of at least 300° C. but not higher than the temperature at which said starting materials and final products will substantially decompose.

2. A process for producing as products alkali metal salts of unsubstituted cyclic carboxylic acids having from 2 to 3 carboxyl groups wherein the cyclic nucleus is selected from the group consisting of mono- and dicyclic aromatic and heterocyclic nuclei containing one hetero atom in the molecule, selected from the group consisting of oxygen, sulfur and nitrogen atoms, by heating as a starting material an alkali metal salt of a cyclic carboxylic acid having from 1 to 2 carboxyl groups in a different relationship on the cyclic nucleus than the carboxyl groups on the final product and corresponding in structure to the product as above produced which comprises the steps of heating said starting material in a substantially oxygen free and anhydrous condition, in the presence of derivatives of cyanic acid, selected from the group consisting of alkali metal salts of cyanic acid and its polymers, cyanamide and dicyandiamide to a temperature of at least 300° C. but not higher than the temperature at which said starting materials and products will substantially decompose.

3. The process of claim 7 wherein the starting materials are salts of heterocyclic carboxylic acids.

4. The process of claim 7 wherein the derivative of cyanic acid is the potassium salt.

5. The process of claim 4 wherein potassium cyanamate is used.

6. The process of claim 4 wherein potassium dicyandiamide is used.

7. A process for producing alkali metal salts of aromatic mono- and dicyclic di- and tricarboxylic acids by heating as a starting material an alkali metal salt of corresponding mono- and dicarboxylic acids having the carboxyl groups in a different relationship on the aromatic nucleus than the carboxyl groups on the final product acid, which comprises the steps of heating said starting material under substantially anhydrous conditions in the presence of derivatives of cyanic acid selected from the group consisting of alkali metal salts of cyanic acid and its polymers cyanamide and dicyandiamide to a temperature of at least 300° C. but not higher than the temperature at which said starting materials and products will substantially decompose.

8. A process for producing as products alkali metal salts of unsubstituted cyclic carboxylic acids having from 2 to 3 carboxyl groups wherein the cyclic nucleus is selected from the group consisting of mono- and dicyclic aromatic and heterocyclic nuclei containing one hetero atom in the molecule, selected from the group consisting of oxygen, sulfur and nitrogen atoms, by heating as a starting material an alkali metal salt of a cyclic carboxylic acid having from 1 to 2 carboxyl groups in a different relationship on the cyclic nucleus than the carboxyl groups on the final product and corresponding in structure to the product as above produced which comprises the steps of heating said starting material under substantially oxygen free, anhydrous conditions in the presence of derivatives of cyanic acid selected from the group consisting of alkali metal salts of cyanic acid and its polymers cyanamide and dicyandiamide, in the presence of an acid binding agent selected from the group consisting of alkali metal carbonates, bicarbonates, formates and oxalates, to a temperature of at least 300° C. but not higher than the temperature at which said starting materials and products will substantially decompose.

9. The process of claim 8 wherein the acid binding agent is potassium carbonate.

10. A process for producing as products alkali metal salts of unsubstituted cyclic carboxylic acids having from 2 to 3 carboxyl groups wherein the cyclic nucleus is selected from the group consisting of mono- and dicyclic aromatic and heterocyclic nuclei containing one hetero atom in the molecule, selected from the group consisting of oxygen, sulfur and nitrogen atoms, by heating as a starting material an alkali metal salt of a cyclic carboxylic acid having from 1 to 2 carboxyl groups in a different relationship on the cyclic nucleus than the carboxyl groups on the final product and corresponding in structure to the product as above produced which comprises the steps of heating said starting material in a substantially oxygen free inert atmosphere under anhydrous conditions, in the presence of derivatives of cyanic acid selected from the group consisting of alkali metal salts of cyanic acid and its polymers, cyanamide and dicyandiamide in the presence of acid binding agents selected from the group consisting of alkali metal carbonates, bicarbonates, formates and oxalates, to a temperature of at least 300° C. but not higher than the temperature at which said starting materials and products will substantially decompose.

11. A process for producing as products alkali metal salts of unsubstituted cyclic carboxylic acids having from 2 to 3 carboxyl groups wherein the cyclic nucleus is selected from the group consisting of mono- and dicyclic aromatic and heterocyclic nuclei containing one hetero atom in the molecule, selected from the group consisting of oxygen, sulfur and nitrogen atoms, by heating as a starting material an alkali metal salt of a cyclic carboxylic acid having from 1 to 2 carboxyl groups in a different relationship on the cyclic nucleus than the carboxyl groups on the final product and corresponding in structure to the product as above produced which comprises the steps of heating said starting material under elevated pressure in a substantially oxygen free atmosphere of carbon dioxide, under anhydrous conditions, in the presence of derivatives of cyanic acid selected from the group consisting of alkali metal salts of cyanic acid and its polymers, cyanamide and dicyandiamide and in the presence of an acid binding agent selected from the group consisting of alkali metal carbonates, bicarbonates, formates and oxalates, to a temperature of at least 300° C. but not higher than the temperature at which said starting materials and products will substantially decompose.

12. A process for producing as products alkali metal salts of unsubstituted cyclic carboxylic acids having from 2 to 3 carboxyl groups wherein the cyclic nucleus is selected from the group consisting of mono- and dicyclic aromatic and heterocyclic nuclei containing one hetero atom in the molecule, selected from the group consisting of oxygen, sulfur and nitrogen atoms, by heating as a starting material an alkali metal salt of a cyclic carboxylic acid having from 1 to 2 carboxyl groups in a different relationship on the cyclic nucleus than the carboxyl groups on the final product and corresponding in structure to the product as above produced which comprises the steps of heating said starting material in a substantially oxygen free, inert atmosphere under anhydrous condition, in the presence of derivatives of cyanic acid selected from the group consisting of alkali metal salts of cyanic acid and its polymers, cyanamide and dicyandiamide and in the presence of an acid binding agent selected from the group consisting of alkali metal carbonates, bicarbonates, formates and oxalates under elevated pressures to a temperature of at least 300° C. but not higher than the temperature at which said starting materials and products will substantially decompose, in the presence of a catalyst containing a metal selected from the group consisting of cadmium, zinc, lead, iron, and mercury.

13. A process for producing as products alkali metal salts of unsubstituted cyclic carboxylic acids having from 2 to 3 carboxyl groups wherein the cyclic nucleus is selected from the group consisting of mono- and dicyclic aromatic and heterocyclic nuclei containing one hetero atom in the molecule, selected from the group consisting of oxygen, sulfur and nitrogen atoms, by heating as a starting material an alkali metal salt of a cyclic carboxylic acid having from 1 to 2 carboxyl groups in a different relationship on the cyclic nucleus than the carboxyl groups on the final product and corresponding in structure to the product as above produced which comprises the steps of forming a melt mixture of a derivative of cyanic acid selected from the group consisting of alkali metal salts of cyanic acid and its polymers, cyanamide and dicyandiamide and a catalyst containing a metal selected from the group consisting of cadmium, zinc, lead, iron and mercury, heating said starting material in the presence of said melt mixture to a temperature of at least 320° C., but not higher than the temperature at which said starting materials and products will substantially decompose.

14. The process of claim 13 wherein the derivative of cyanic acid is potassium cyanate.

15. A process for producing as products alkali metal salts of unsubstituted cyclic carboxylic acids having from 2 to 3 carboxyl groups wherein the cyclic nucleus is selected from the group consisting of mono- and dicyclic aromatic and heterocyclic nuclei containing one hetero atom in the molecule, selected from the group consisting of oxygen, sulfur and nitrogen atoms, by heating as a starting material an alkali metal salt of cyclic carboxylic acid having from 1 to 2 carboxyl groups in a different relationship on the cyclic nucleus than the carboxyl groups on the final product and corresponding in structure to the product as above produced which comprises the steps of heating said starting material in a melt of potassium cyanate, in the presence of a catalyst containing a metal selected from the group consisting of cadmium, zinc, lead, iron and mercury, to a temperature of at least 320° C. and not higher than 450° C.

16. A process for producing terephthalic acid from benzoic acid which comprises the steps of forming the potassium salt of benzoic acid, heating said potassium benzoate in an atmosphere of carbon dioxide, at elevated pressures, in the presence of potassium cyanate, potassium carbonate and a catalyst containing a metal selected from the group consisting of cadmium, zinc, lead, iron and mercury, to a temperature of at least 300° C. but not higher than the temperature at which said starting materials and products will substantially decompose to produce a rearranged reaction product dipotassium terephthalate, and separating terephthalic acid from said reaction product by acidification.

17. A process for producing a mixture of isophthalic acid and terephthalic acid as products by heating, as a starting material, potassium orthophthalate, which comprises the steps of heating said starting material in a melt of potassium cyanate in the presence of a cadmium compound soluble in the cyanate melt, to a temperature of at least 320° C. but not higher than 450° C. to form potassium salts the product mixture acids, and thereafter separating isophthalic and terephthalic acid from said product mixture by acidification.

References Cited in the file of this patent

FOREIGN PATENTS 744,721 Great Britain _____ Feb. 15, 1956

UNITED STATES PATENT OFFICE
CERTIFICATE OF CORRECTION

Patent No. 3,023,234　　　　　　　　　　　　　February 27, 1962

Hartwig Schutt et al.

It is hereby certified that error appears in the above numbered patent requiring correction and that the said Letters Patent should read as corrected below.

Column 7, line 6, for "weighted" read -- weighed --; column 13, lines 13 and 15, for the claim reference numeral "7", each occurrence, read -- 2 --.

Signed and sealed this 7th day of August 1962.

(SEAL)
Attest:

ERNEST W. SWIDER　　　　　　　　　　　　　DAVID L. LADD
Attesting Officer　　　　　　　　　　　　　Commissioner of Patents